United States Patent [19]

Fishbaugh et al.

[11] 4,452,591

[45] Jun. 5, 1984

[54] RESILIENT ROTARY COUPLING

[75] Inventors: Byron L. Fishbaugh; Harold E. Keller, both of St. Mary's, Ohio; John P. Van Der Aue, West Bloomfield, Mich.

[73] Assignee: The Goodyear Tire & Rubber Company, Akron, Ohio

[21] Appl. No.: 470,083

[22] Filed: Feb. 28, 1983

Related U.S. Application Data

[63] Continuation of Ser. No. 181,525, Aug. 26, 1980, abandoned.

[51] Int. Cl.³ ............................................. F16D 3/76
[52] U.S. Cl. ................................. 464/89; 416/134 R
[58] Field of Search .............. 416/134 R; 464/89, 150, 464/181, 30

[56] References Cited

U.S. PATENT DOCUMENTS

| | | | |
|---|---|---|---|
| 1,906,057 | 4/1933 | Guy | 464/89 |
| 2,164,485 | 7/1939 | Yantis | 464/89 X |
| 2,235,605 | 3/1941 | Bugatti | 464/89 X |
| 2,539,630 | 1/1951 | Krueger et al. | 464/89 X |
| 2,948,129 | 8/1960 | Troyer | 464/89 |
| 2,956,187 | 10/1960 | Wood | 464/89 X |
| 2,993,544 | 7/1961 | Carlson | 464/83 X |
| 3,045,763 | 7/1962 | Perrott | 464/83 X |
| 3,146,612 | 9/1964 | Lorenz | 464/89 X |
| 3,256,939 | 6/1966 | Novak | 416/134 R |
| 3,477,794 | 11/1969 | Abbott et al. | 464/89 X |
| 3,594,892 | 7/1971 | Stewart | 464/89 X |
| 3,748,061 | 7/1973 | Henrich | 416/134 R |
| 4,041,730 | 8/1977 | Kress | 464/89 X |

FOREIGN PATENT DOCUMENTS

1010911 6/1952 France ................................. 464/89

Primary Examiner—Stuart S. Levy
Assistant Examiner—Daniel P. Stodola
Attorney, Agent, or Firm—R. D. Thompson

[57] ABSTRACT

A resilient rotary coupling and a marine drive including same are described. The coupling includes inner and outer rotary members. The inner surface of the outer rotary member and the periphery of the inner member are of similar configuration and include, when viewed in cross section, at least two arcs of greater radius of curvature symmetrically disposed about the axis of rotation connected in alternate manner by an equal number of arcs of lesser radius of curvature, the arcs of greater radius of curvature being located closer to the axis of rotation than the arcs of lesser radius of curvature, the center of curvature of each of said arcs lying on or within the boundary of the closed figure defined by the inner surface in said section. The arcs are connected to one another without any abrupt change of radius or radius of curvature. Resilient means are disposed between the outer and inner rotary members. The resilient means is in radial compression and contacts completely in the circumferential direction of the members at least a portion of the inner surface of the outer member and the periphery of the inner member. The coupling may be designed so as to permit slippage upon application of loads in excess of design or to permit torsional shock absorption up to a maximum torque load at which time the inner and outer rotary members mechanically lock up relative to one another thereby preventing further angular displacement of them relative to one another.

11 Claims, 7 Drawing Figures

RESILIENT ROTARY COUPLING

This application is a continuation of application Ser. No. 181,525, filed Aug. 26, 1980, now abandoned.

BACKGROUND OF THE INVENTION

The abstract is not to be taken as limiting the invention of this application and in order to understand the full nature and extent of the technical disclosure of this application, reference must be made to the accompanying drawing and the following detailed description.

The invention pertains to a resilient rotary coupling. The coupling is particularly suited for use in a marine propeller drive, although it is not intended that the invention be limited to such application.

The need for torsional shock and vibration absorption between the propeller drive shaft and the propeller has long been recognized. Many arrangements have been proposed.

SUMMARY OF THE INVENTION

In accordance with one aspect of the present invention there is provided a marine drive including a resilient rotary coupling having an axis of rotation comprising: an outer rotary member having an axially elongated inner surface which in section taken perpendicularly to said axis includes at least two arcs of greater radius of curvature symmetrically disposed about said axis connected in alternate manner by an equal number of arcs of lesser radius of curvature, said arcs of greater radius of curvature being located closer to said axis than said arcs of lesser radius of curvature, the center of curvature of each of said arcs lying on or within the boundary of the closed figure defined by said inner surface in said section and the arcs being connected to one another without any abrupt change of radius or radius of curvature; an inner rotary member having an axially elongated periphery opposing the inner surface of said outer member, said periphery being of a cross-sectional configuration generally corresponding and complementary to that of the inner surface of said outer member but being of lesser radial dimensions such that the periphery of said inner member is spaced radially from the inner surface of said outer member when each is centered on said axis and no load is imposed on the coupling; and resilient elastomeric means disposed between said outer and inner members, said resilient means being in radial compression and contacting completely in the circumferential direction of said coupling at least a portion of each of said inner surface and said periphery; the corresponding arcs of lesser radius of curvature of the inner and outer members being generally aligned when there is no load imposed on the coupling.

In accordance with another aspect of the present invention there is provided in a marine drive, a resilient rotary coupling having an axis of rotation comprising an outer rotary member having an axially elongated inner surface of generally square cross-sectional configuration comprising a series of four chordally disposed flat areas connected by rounded corners disposed a greater radial distance from said axis than the radial distance of a bi-secting radius normal to said flat areas, the circumferentially measured arc length of each rounded corner being at least equal to the circumferentially measured dimension of each flat area; an inner rotary member comprising a metallic bushing adapted to be received on and matingly engage a shaft, said inner member having an axially elongated periphery opposing the inner surface of said outer member, said periphery being of generally square cross-sectional configuration generally corresponding and complementary to that of the inner surface of said outer member but being of lesser radial dimensions such that the periphery of said inner member is spaced radially inwardly from the inner surface of said outer member when each is centered on said axis and no load is imposed on the coupling; and resilient elastomeric means of vulcanized rubber disposed between said outer and inner members and bonded to said inner member, said resilient means being approximately equally radially compressed throughout its circumferential and axial extent between said inner surface and said periphery, the amount of compression being about 35 percent upon assembly of the coupling and about 60 percent when the inner member and outer member are angularly displaced such that the corners of the inner member are nearest the flat areas of the inner surface of the outer member; the corresponding flat areas of the outer and inner members being generally parallel and symmetrically disposed about said axis when there is no load imposed on the coupling.

DETAILED DESCRIPTION OF THE PREFERRED EMBODIMENT

Figure 1:
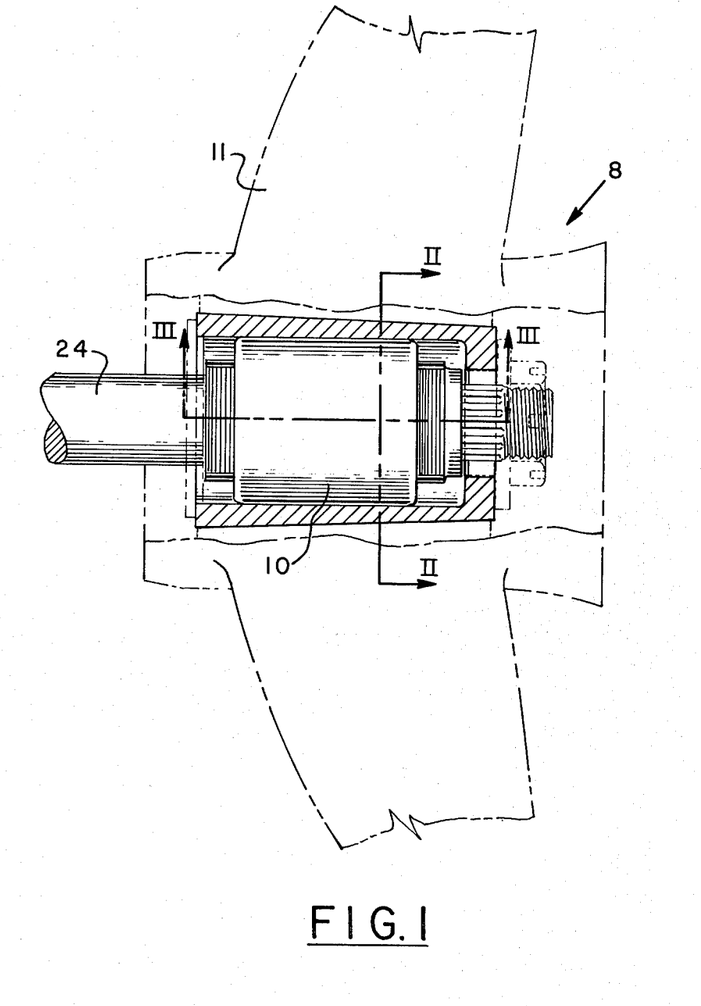
FIG. 1 is a side elevation partially in section of a portion of a marine drive according to an embodiment of the invention.

Referring to FIG. 1 there is shown a portion of a marine drive 8 including a resilient rotary coupling 10 according to an embodiment of the invention coupling a shaft 24 to a marine propeller 11.

Figure 2:
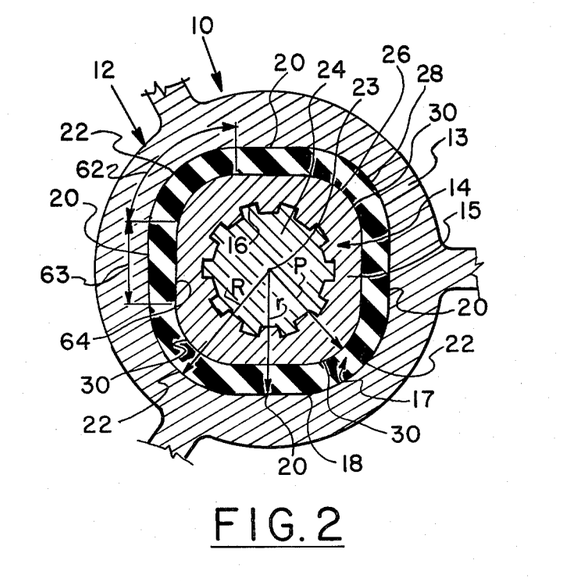
FIG. 2 is a fragmentary cross-sectional view taken perpendicular to the axis of rotation of the coupling along line II—II of FIG. 1.
Figure 3:
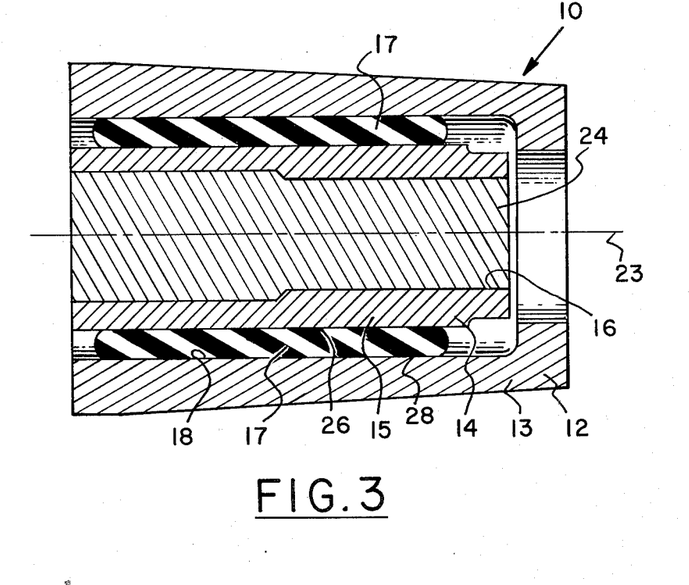
FIG. 3 is a fragmentary cross-sectional view taken parallel to the axis of rotation of the coupling along line III—III of FIG. 1.

Referring to FIGS. 2 and 3 there is shown an embodiment of a resilient rotary coupling 10 according to the invention as applied to a marine propeller drive installation. The resilient rotary coupling 10 includes an outer rotary member 12 shown as an example as propeller hub 13, an inner rotary member 14 shown as an example as bushing 15, of complementary configuration and resilient means 17 disposed between the outer and inner members.

The outer rotary member 12 includes an axially elongated inner surface 18 of polygonal cross section. As illustrated in FIG. 2 the inner surface 18 of the propeller hub 13 includes four chordally disposed flat areas 20 with the adjacent ones of the flat areas connected to one another by rounded corners 22. The rounded corners 22 are disposed a greater radial distance R from the axis of rotation 23 of the resilient rotary coupling 10 than the radial distance r of a bi-secting radius normal to said flat areas 20. Mathematically expressed, $R/r > 1$.

While the outer rotary member 12 illustrated is a marine propeller, or more particularly, the hub 13 of a marine propeller, it is to be understood that such outer rotary member could be any suitable driving or driven member in a machine arrangement.

The resilient rotary coupling 10 also includes an inner rotary member 14 which in the examples shown is a metallic bushing 15 having a configured bore 16 for mating engagement with the propeller drive shaft 24. The inner rotary member 14 includes an axially elongated periphery 26 in confronting or opposing relationship to the inner surface 18 of the hub 13 of the propeller 11. The periphery 26 of the inner member 14 is of polygonal cross section generally corresponding and complementary to that of the inner surface 18 of the outer member 12. As shown in FIGS. 2 and 3, the periphery 26 of the bushing 15 is of lesser radial dimensions than those of the inner surface 18 of the propeller hub 13. In other words the periphery 26 of the bushing 15 is spaced radially inwardly toward the axis of rotation from the inner surface 18 of the outer member 12 when each is centered on the axis of rotation 23 of the coupling 10 and no load is imposed.

It is to be understood that the inner member 14 could alternately be formed so as to be an integral part of the drive shaft 24 or could itself be the driven member rather than the driving member of the coupling.

The coupling 10 also includes resilient means 17 disposed between the outer member 12 and inner member 14. The resilient means 17 is in radial compression even when no load or torque is applied or being transmitted through the coupling 10. The resilient means 17 is brought into initial radial compression upon assembly of the coupling 10. The resilient means 17 contacts completely in the circumferential direction of the coupling 10 at least a portion of said axially elongated inner surface 18 of the outer member 12 and the axially elongated periphery 26 of the inner member 14. When viewed in the cross section shown in FIG. 2, the resilient means 17 contacts all of the periphery 26 of the bushing 15. In this cross-section, the periphery 28 of the resilient means 17 is itself contacted by all of the inner surface 18 of the outer member 12. As shown in FIGS. 2 and 3, there are no voids between the opposed working surfaces 26, 18 of the inner and outer members since this space is occupied completely by the resilient means 17. The resilient means 17 is preferably continuous in the circumferential direction of the coupling 10 and bonded to one of the respective inner or outer rotary members 14,12. It is most preferable that the resilient means 17 be bonded to the inner rotary member 14 such as to bushing 15 illustrated in FIGS. 1 through 5.

The resilient means 17 is formed of an elastic polymeric material and is preferably made of natural rubber, or of a synthetic polyisoprene blended with styrene butadiene rubber. When rubber is used for the resilient means, it should be compounded to a durometer of about 75 to 80 Shore A Hardness and be high in tear strength and adhesion as measured on a peel-type strip test such as ASTM D429, Method B. Compression set should be as low as obtainable while maintaining the above given properties and preferably should not exceed 25 to 30% when measured according to ASTM D395, Method B, for 22 hours at about 158° F. It is believed that other elastomeric materials may be satisfactory in this application, including polyurethane. Specific formulations are not presented herein as suitable formulations are known or readily developed by those skilled in the art.

Figure 4:
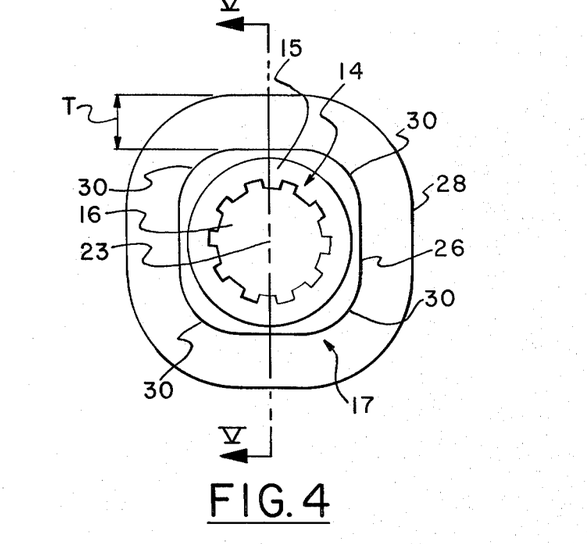
FIG. 4 is an end view of the inner member and resilient means shown in FIGS. 2 and 3.
Figure 5:
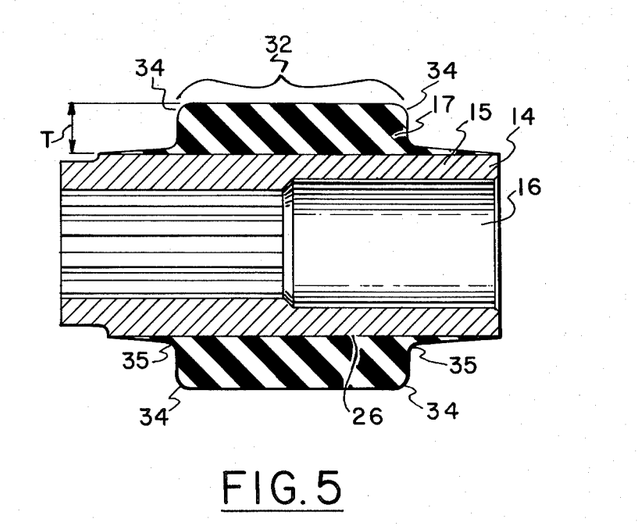
FIG. 5 is a cross-sectional view taken along lines V—V of FIG. 4.

The undeformed configuration of a preferred embodiment of the resilient means 17 is shown in FIGS. 4 and 5 in which the bushing 15 of the coupling 10 shown in FIGS. 1, 2 and 3 is illustrated including in its as-manufactured, undeformed state the resilient means 17 of vulcanized rubber of thickness T bonded to the central portion 32 of its periphery 26. The thickness T of the resilient means 17 as measured along a radius extending perpendicularly from the axis of rotation 23 of the bushing 15 is in a preferred embodiment reduced about 35% upon installation of the bushing 15 with the resilient means 17 bonded thereto into the outer member 12. The configuration of the outer member 12 and the bushing 15 are preferably chosen such that the resilient means 17 is further compressed at maximum torsional load to about 60% of its original undeformed radial dimension. In other words, when the corners 30 of the inner member 14 are nearest the flat areas 20 of the outer member 12, the resilient means 17 is compressed about 60% in the radial direction at those areas.

Because the resilient means 17 undergoes considerable radial compression upon assembly of the coupling 10 the resilient elastomeric means in its undeformed, as-manufactured state is preferably of considerably greater radial dimension and lesser axial dimension than in the assembled coupling. In this regard compare FIG. 5 with FIG. 3. For this reason the resilient means 17 preferably in its undeformed state contacts and is bonded to the central portion 32 of the periphery 26 of the bushing 15 and is of generally uniform thickness T throughout both its circumferential and axial extent in central portion 32. The resilient means 17 preferably has radiused corners 34 which extend about its circumference at its axial extremities and fillets 35 at its junction with the periphery 26 of bushing 15 to reduce stresses at these locations. These stresses are particularly high during assembly of the coupling 10. The bushing 15 includes an internal bore 16 for mating engagement with a drive shaft such as propeller shaft 24 shown in FIGS. 1, 2 and 3.

Figure 6:
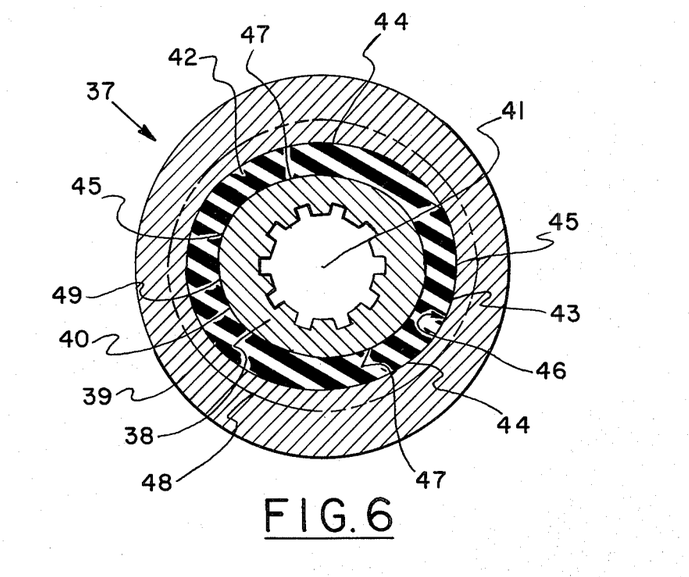
FIG. 6 is a cross-sectional view taken perpendicular to the axis of rotation of another embodiment of a coupling according to the invention.

Referring now to FIG. 6 there is illustrated another embodiment according to the invention of a rotary coupling 37. The periphery 40 of the inner member 38 when viewed from the end or in a cross section taken normal to the axis of rotation 41 of the inner member 38 is of generally elliptical configuration. It is believed that the ratio of the major axis to minor axis should be in the range of 1.05 to 1.15 to obtain maximum angular displacement of the inner member 38 and outer member 39 relative to each other without seriously damaging the rubber of resilient means 42 when it is subjected to maximum impact torsional loading. This design permits a full 90° angular displacement before the resilient means 42 is subjected to its maximum radial compression whereas in the embodiment illustrated in FIGS. 1–5 the resilient means 17 is subjected to its maximum radial compression at 45° displacement of the inner member 14 relative to the outer member 12. In the embodiment illustrated in FIG. 6 the outer rotary member 39 includes an axially elongated inner surface 43 which in a section taken perpendicularly to the axis of rotation 41 includes two arcs 44 of greater radius of curvature which are diametrically opposed from one another. These arcs 44 are connected in alternate manner by two arcs 45 of lesser radius of curvature which are also diametrically opposed from one another. The arcs 44 of greater radius of curvature are located closer to the axis of rotation 41 than the arcs 45 of lesser radius of curvature. As with the embodiments already discussed, the periphery 40 of the inner rotary member 38 opposes the inner surface 46 of the outer member 39. The periphery 40 of the inner member 38 is of a configuration generally corresponding and complementary to that of the inner surface 46 of the outer member 39 but is of lesser radial dimensions such that the periphery 40 of the inner member 38 is spaced radially from the inner surface of the outer member when each is centered on the axis of rotation 41 and no load is imposed on the coupling. This spacing need not be exactly equal throughout the circumferential direction. The periphery 40 of the inner member 38 may be mathematically specified and the inner surface 46 of the outer member 39 constructed therefrom or mathematically specified. When both are mathematically specified as true elipses, the distance between them will not be a true constant at all points. This non-uniformity is believed not to adversely affect the coupling and may provide a means for tuning the torsional load versus angular deflection characteristics of the coupling. Resilient elastomeric means 42 is disposed between the inner and outer members. The resilient means 42 is in radial compression and contacts completely in a circumferential direction of the coupling the inner working surface 46 of the outer member 39 and the working periphery 40 of the inner member 38. When no load is imposed on the coupling the corresponding arcs 44,47 of lesser radius of curvature of the outer and inner members are generally aligned. When a torsional load is imposed on the coupling these corresponding areas 44,47 of lesser radius of curvature are angularly displaced relative to one another thus increasing the amount of compression of the resilient means 42 adjacent the arcs 49 of lesser radius curvature of the inner rotary member 38. The resilient means 42 is compressed about 35% from its undeformed configuration upon assembly of the coupling 37. The periphery 48 of the resilient means 42 before being compressed is shown by dashed lines in FIG. 6. The resilient member 42 is of approximately even thickness throughout and is approximately evenly compressed throughout upon assembly of the coupling 37.

Figure 7:
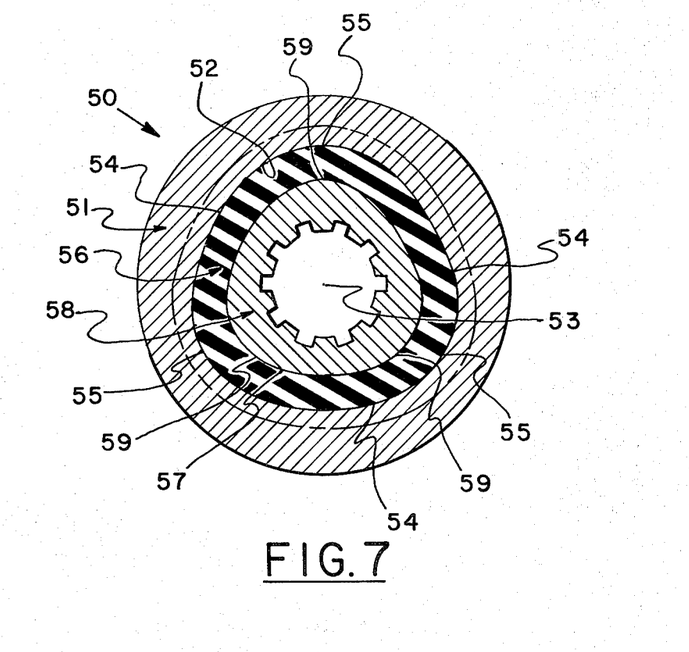
FIG. 7 is a cross-sectional view taken perpendicular to the axis of rotation of another embodiment of a coupling according to the invention.

In FIG. 7 there is shown yet another embodiment of a coupling 50 according to the invention. The outer rotary member 51 includes an axially elongated inner surface 52 which in a section taken perpendicularly to the axis of rotation 53 includes three arcs 54 of greater radius of curvature symmetrically disposed about the axis of rotation 53. The arcs 54 of greater radius of curvature are connected in alternate manner by an equal number of arcs 55 of lesser radius of curvature which are also symmetrically disposed about the axis of rotation 53. The arcs 54 of greater radius or curvature are located closer to the axis of rotation 53 than the arcs 55 of lesser radius of curvature. The center of curvature of each of said arcs lies within the outer boundary of the section of the inner surface 52. The arcs 54,55 are connected to one another without any abrupt change of radius or of radius or curvature. The configuration depicted in FIG. 7 may be called tri-oval. As in the other embodiments shown the resilient means 56 is of substantially even thickness throughout between the inner surface 52 of outer member 51 and the periphery 57 of inner member 58 and is substantially evenly compressed upon assembly of the coupling 50. The inner and outer rotary members are of complementary configuration. The arcs 59 of lesser radius of curvature of the inner rotary member 58 are generally aligned with the arcs 55 of lesser radius of curvature of the outer rotary member when no load is imposed onto the coupling and are angularly displaced relative to one another upon imposition of a torsional load, thus increasing compression of the resilient means 56.

A coupling according to the present invention can be designed so as to permit permanent angular displacement or, in other words, rotary slip, ratcheting or indexing or the inner and outer members relative to one another. In the embodiment shown in FIGS. 1-5 if rotary slip at a predetermined torque is desired the radial distance P from the axis of rotation 23 of the rounded corners 30 of the inner member 14 must be less than the radial distance r of a bisecting radius normal to the flat areas 20 of the outer member 12. Expressed mathematically, $P<r$. Referring to FIG. 6, if rotary slip at a predetermined torque is desired the radial distance from the axis of rotation 41 of the arc 49 of lesser radius of curvature of the inner member 38 must be less than the radial distance of the arc 44 of greater radius of curvature of the outer member 39.

On the other hand, if it is desired to provide limited angular displacement between the inner and outer rotary members of a coupling according to the invention, this too, can be provided by design choice of the relative dimensions of the inner and outer rotary members. For example, in the embodiment shown in FIGS. 1-5 the radial distance P from the axis of rotation 23 of the rounded corners 30 of the inner member 14 would be established greater than the radial distance r of a bisecting radius normal to the flat areas 20 of the outer member 12. Expressed mathematically, $P>r$. When this relationship exists, upon sufficient angular or rotary deflection or displacement of the rounded corners 30 of the inner member 14 relative to those of the outer member 12 the rounded corners 30 of the inner member 14 come into contact with the flat areas 20 of the correspondingly configured outer member 12 and prevent any further angular displacement of the members 12 and 14 relative to one another. Because the resilient means is not fluid, lockup will occur at some value of $P \leq r$, provided the torque load does not cause total failure of the resilient means through excessive shearing. At displacements below that at which mechanical lockup occurs the resilient elastomeric means 17 cushions any torque loading between the inner member 14 and outer member 12. In similar fashion the dimensions of the inner and outer members in the embodiment shown in FIGS. 6 and 7 can be established such that upon sufficient angular or rotary deflection of the inner and outer members relative to one another the arcs of lesser radius of curvature of the inner rotary member will come into contact or interference with the arcs of greater radius of curvature of the outer rotary member to prevent further angular displacement of the inner and outer rotary members relative to one another.

It is believed that the radial distance between the inner surface of the outer member and the periphery of the inner member should be established such that the resilient means when formed of rubber is compressed about 35% upon assembly of the coupling. Because the inner and outer rotary members are of generally corresponding and complementary cross-sectional configuration the resilient means is approximately compressed uniformly about the circumference of the coupling. In a preferred high torque capability embodiment of the coupling similar to that shown in FIGS. 1-5 the radial distance between the inner surface 18 of the outer member 12 and the periphery 26 of the inner member 14 as well as the radial distance P of the corners 30 of the inner member 14 in comparison to the radial distance r of bisecting radius normal to the flat areas 20 was chosen such that when the inner member 14 and the outer member 12 are angularly displaced relative to one another so that the corners 30 of the inner member 14 are nearest the flat area 20 of the inner surface 18 of the outer member 12 the resilient means 17 is compressed to about 60% of its new undeformed configuration. It is believed that when rubber is used for the resilient means that maximum radial compression should be restricted to about 60%. An exception to this guideline, of course, exists when the members of the coupling are dimensioned such that interference of the periphery of the inner member and the inner surface of the outer member will occur upon sufficient angular deflection.

It has already been explained that the coupling can be designed so as to permit angular slip between its inner and outer members or to be of a lock-up or non-slipping type design. The radius of the corners 30 or areas of smaller radius of curvature on the inner member 14 also have an effect on torque characteristics and the life of the coupling 10 and particularly on the life of the intermediate resilient means 17. If the corners 30 of the inner member 14 are sharper, that is, of a smaller radius of curvature, when all other factors are equal, it is more likely that the resilient means 17 may become cut, torn or ruptured. It is thus preferable that the circumferential arc length 62 of each rounded corner 30 of the inner member or arc of lesser radius of curvature be at least equal to the circumferential dimension 63 of each flat area 64 or arc of greater radius of curvature of the inner member 14. It is most preferable that the circumferential arc length of each rounded corner 30 or arc of lesser radius of curvature of the inner member be at least 150% of the circumferential dimension of each flat area 20 or area of greater radius of curvature of the respective inner member. In the embodiment shown in FIGS. 1-5, which is a preferred embodiment, the circumferential arc length of each rounded corner is equal to or greater than the circumferential dimension of the corresponding flat area of the respective inner member 14, outer member 12 or resilient means 17.

In the embodiment illustrated in FIGS. 1-5, the periphery 26 of the inner member 14, the inner surface 18 of the outer member 12, and the resilient means 17 are each of generally square cross-sectional configuration and include four flat areas connected by rounded corners and are of generally uniform size throughout the axial extent of the confronting surfaces. No taper in the direction of the axis of rotation is required in a coupling according to the invention, although such taper may be employed to ease assembly and disassembly of the coupling. When used in a marine drive, the coupling is removed as a unit from the propeller shaft. The coupling itself is not intended to be serviced in the field due to press fitting of the inner member into the outer member with attendant compression of the resilient means.

The configuration of the inner and outer members and the resilient means have been described to be polygonal or polyoval. The minimum number of flat areas, i.e., areas of greater radius of curvature is two and this will usually by employed in a lock-up type design having a limited angular deflection between the inner and outer members of the coupling. All else being held constant, as the number of flat areas on the inner and outer members is increased it becomes easier to cause the inner and outer members to slip rotationally relative to one another. As the number of flat areas on the inner and outer members is increased the angular displacement between the inner and outer members prior to permanent slip or angular displacement of these members relative to one another is lowered as is the maximum torque transmission capability of the coupling for a given overall physical size, similar compounding for the resilient means, and same degree of precompression of the resilient means upon assembly of the coupling. It is believed that about eight flat areas on the inner and outer members are a practical maximum number. It is to be noted that the configuration of the inner and outer members does not have to be that of a regular polygon having rounded corners as illustrated but rather can be rectangular with rounded corners or elliptical, tri-oval or polyoval. A configuration which is symmetrical about the axis of rotation of the coupling however is preferred to avoid radial displacement of the inner or outer members relative to the axis of rotation upon application of a torque load.

In preferred embodiments, the resilient means is formed of vulcanized rubber and is sized so as to be subjected to substantially equal radial compression at all points about its circumference upon assembly of the inner and outer members to form a coupling of the invention. Increasing the amount of radial compression of the resilient means upon assembly of the coupling will increase the torsional spring rate and maximum torque capability of the coupling, all else being equal and vice versa. Preferably the resilient means is adhered to the inner member and has a relatively high adhesion, for example, about 50 pounds per inch width as measured by cutting the resilient means and allowing the part to roll and thereby peeling the resilient means from the inner member.

The resilient means is preferably molded and bonded to the inner member. Transfer or injection molding are preferred over compression molding since the latter is not believed to be as accurate. It is desired that concentricity of the inner and outer members be maintained and therefore an accurate molding process for evenly forming the resilient means about the inner member is desirable.

The term "axially" and related terms as used herein mean in the direction of or parallel to the axis of rotation of the coupling or that of any of its constituent elements such as the inner member, the resilient means, or the outer member as herein described. The term "radially" and related terms as used herein mean in a plane intersecting the axis of rotation and perpendicular to the axis of rotation as defined herein. The term "circumferentially" and related terms as used herein mean in a direction around the axis of rotation as defined herein.

The term "arc" and related terms as used herein mean a curved line or any section of a curve and are not to be limited to a constant radius of curvature but are intended to include a continuously changing radius of curvature.

The term "polyoval" as used herein refers to a closed two dimensional figure all of whose boundary portions are straight or curved such that the center of radius of curvature of all points of the boundary lie on or within the figure. An example of a polyoval is shown by the periphery of the inner member in FIG. 7, which is a tri-oval. A coupling could, of course, be designed with a greater number of arcs of lesser radius of curvature, with about eight such areas believed to be the practical maximum.

While certain representative embodiments and details have been shown for the purpose of illustrating the invention it will be apparent to those skilled in the art that various changes and modifications may be made therein without departing from the spirit or scope of the invention.

The subject matter claimed is:

1. A resilient, indexing, rotary marine drive coupling for a marine propellor drive having a propellor and a propellor drive shaft, the coupling having an axis of rotation and being adapted to couple the propellor and the propellor drive shaft of the marine drive, the coupling comprising:
   (a) an outer rotary member having an axially elongated inner surface which in section taken perpendicularly to said axis includes at least two arcs of a first radius of curvature having first centers of curvature symmetrically disposed about said axis and an equal number of arcs of a second radius of curvature having second centers of curvature and connecting in alternate manner said arcs of a first radius of curvature, said first radius being a greater radius than said second radius and said second radius being a lesser radius than said first radius, said arcs of greater radius of curvature being located closer to said axis than said arcs of lesser radius of curvature, said inner surface in said section defining a closed figure with a boundary and the first and second centers of curvature of each of said arcs lying on or within the boundary of the closed figure defined by said inner surface in said section and the arcs being connected to one another without any abrupt change of radius or radius of curvature,
   (b) an inner rotary member having an axially elongated periphery opposing the inner surface of said outer member, said periphery being of a cross-sectional configuration generally corresponding and complementary to the inner surface of said outer member and having corresponding arcs of greater and lesser radii of curvature having lesser radial dimensions than said arcs of greater and lesser radius, respectively, of said outer member such that the periphery of said inner member is spaced radially from the inner surface of said outer member when each member is centered on said axis and no load is imposed on the coupling, and
   (c) resilient elastomeric means disposed between said outer and inner members, said resilient means being in radial compression and contacting completely in the circumferential direction of said coupling at least a portion of each of said inner surface and said periphery,
   (d) in which the corresponding arcs of lesser radius of curvature of the inner and outer members are generally aligned when there is no load imposed on the coupling, and
   (e) in which the radial distance from the axis of the arcs of lesser radius of curvature of the inner member is less than the radial distance from the axis of the arcs of greater radius of curvature of the outer member, the resiliency of said elastomeric means and the difference between said radial distances being such that permanent rotary displacement of the inner member relative to the outer member occurs to provide said indexing.

2. A marine propellor drive according to claim 1 in which the resilient rotary marine drive coupling includes the outer rotary member having the axially elongated inner surface being of polygonal cross section comprising a series of at least 3 chordally disposed straight lines connected by rounded corners, and the inner rotary member includes the axially elongated periphery being of polygonal cross section generally corresponding and complementary to that of the inner surface of the outer member, the corresponding straight lines in cross section of the outer and inner members being generally parallel when there is no load imposed on the coupling.

3. The marine propellor drive of claim 1 or claim 2 in which the radial distance between the inner surface of the outer member and the periphery of the inner member is such that the resilient means is compressed about 35% upon assembly of the coupling and is further compressed to about 60% when the inner member and the outer member are angularly displaced relative to one another such that the arcs of lesser radius of curvature of the inner member are nearest the arcs of greater radius of curvature of the inner surface of the outer member.

4. The marine propellor drive of claim 2 in which the circumferential arc length of each rounded corner is at least equal to the circumferential dimension of each flat area of the respective inner member, outer member or resilient means.

5. The marine propellor drive of claim 1 in which the resilient means is continuous in the circumferential direction of the coupling and is bonded to one of the inner or outer rotary members.

6. The marine propellor drive of claim 1 in which the inner member comprises a metallic bushing adapted to be received on and matingly engage the propellor drive shaft, the resilient means is continuous and is bonded to the central portion of the periphery of the bushing and in its undeformed state is of generally uniform thickness in the central portion of the axial extent of the periphery of the bushing and has radiused circumferentially extending corners and fillets at its axial extremities.

7. The marine propellor drive of claim 1 in which the inner surface of the outer member, the periphery of the inner member, and the resilient means, when viewed in cross section taken perpendicular to said axis, are each of generally square configuration including four flat areas connected by rounded corners and of generally uniform size throughout the axial extent of their confronting surfaces.

8. The marine propellor drive of claim 1 in which the resilient means is of vulcanized rubber and is approximately equally compressed at all points about its circumference when no load is imposed on the coupling.

9. The marine propellor drive of claim 1 in which the outer rotary member includes the axially elongated inner surface being of elliptical cross section and the inner rotary member includes the axially elongated periphery being of elliptical cross section.

10. The marine propellor drive of claim 1 in which the outer rotary member includes the inner surface being of tri-oval cross section and the inner rotary member includes the axially elongated periphery being of tri-oval cross section.

11. A resilient, indexing, rotary marine drive coupling for a marine propellor drive having a propellor and a propellor drive shaft, the coupling having an axis of rotation and being adapted to couple the propellor and the propellor drive shaft of the marine drive, the coupling comprising:

(a) an outer rotary member having an axially elongated inner surface of generally square cross-sectional configuration comprising a series of four of a circumferentially measured arc length chordally disposed flat areas of a circumferentially measured dimension and rounded corners, the flat areas being connected by the rounded corners, the rounded corners being disposed a greater radial distance from said axis than the radial distance of a bi-secting radius normal to said flat areas, the circumferentially measured arc length of each rounded corner being at least equal to the circumferentially measured dimension of each flat area, (b) an inner rotary member comprising a metallic bushing adapted to be received on and matingly engage a shaft, said inner member having an axially elongated periphery opposing the inner surface of said outer member, said periphery being of generally square cross-sectional configuration generally corresponding and complementary to the inner surface of said outer member and having corresponding flat areas and rounded corners being lesser radial dimensions than the flat areas and rounded corners, respectively, of the outer member such that the periphery of said inner member is spaced radially inwardly from the inner surface of said outer member when each member is centered on said axis and no load is imposed on the coupling, and (c) resilient elastomeric means of vulcanized rubber disposed between said outer and inner members and bonded to said inner member, said resilient means being approximately equally radially compressed throughout its circumferential and axial extent between said inner surface and said periphery and contacting completely in the circumferential direction of said coupling at least a portion of each of said inner surface and said periphery, the amount of compression being about 35 percent upon assembly of the coupling and about 60 percent when the inner member and outer member are angularly displaced such that the corners of the inner member are nearest the flat areas of the inner surface of the outer member, (d) in which the corresponding flat areas of the outer and inner members are generally parallel and symmetrically disposed about said axis when there is no load imposed on the coupling, and (e) in which the radial distance from the axis of the rounded corners of the inner member is less than the radial distance of the bi-secting radius of the outer member, the resiliency of said elastomeric means and the difference between said radial distances being such that permanent rotary displacement of the inner member relative to the outer member occurs to provide said indexing.

* * * * *